July 18, 1944.  D. S. EDDINS  2,353,820
VEHICLE BODY
Filed June 28, 1941
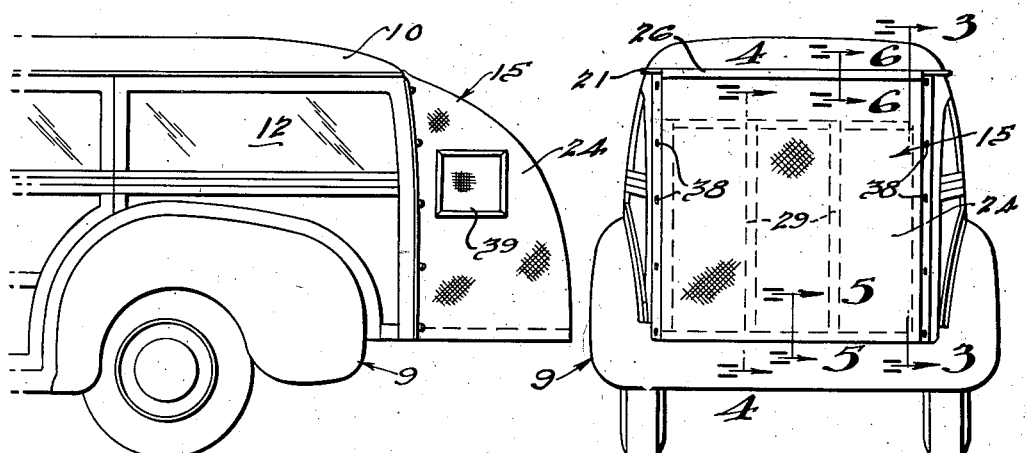
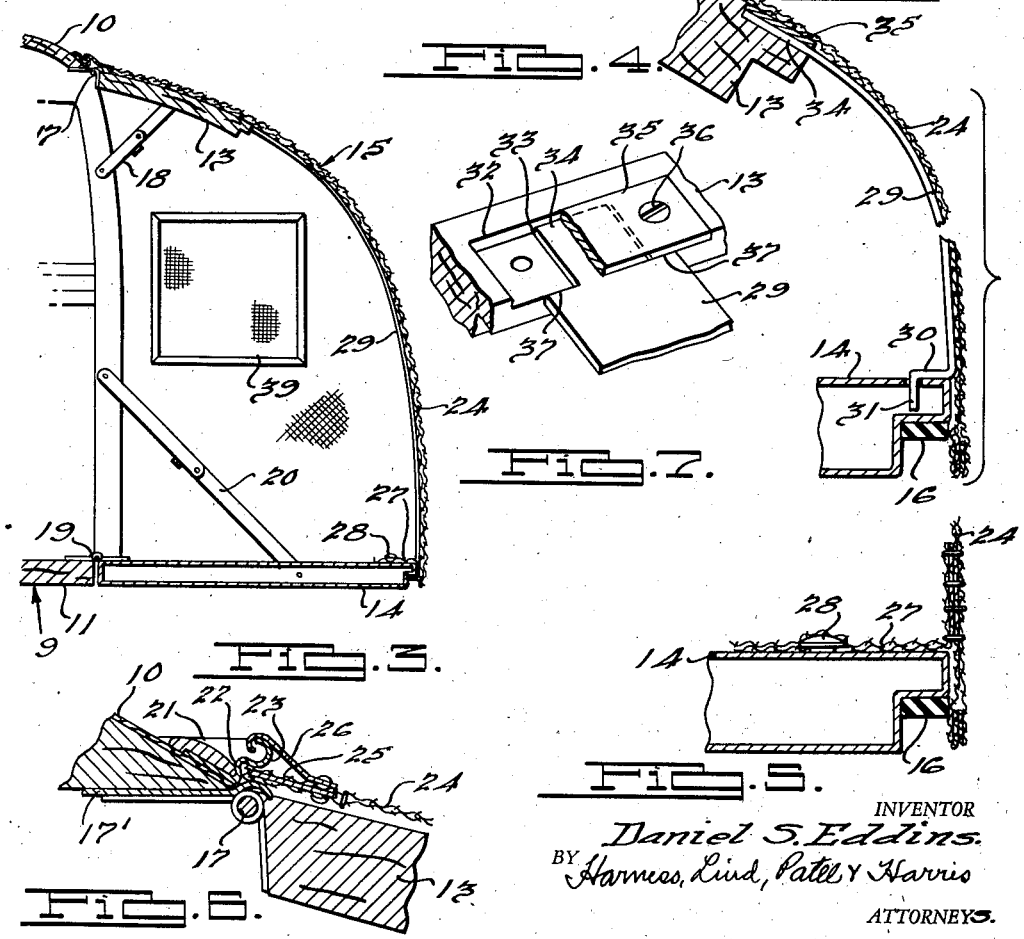
INVENTOR
Daniel S. Eddins
BY Harness, Lind, Patel & Harris
ATTORNEYS.

Patented July 18, 1944

2,353,820

UNITED STATES PATENT OFFICE 2,353,820

VEHICLE BODY

Daniel S. Eddins, Detroit, Mich., assignor to Chrysler Corporation, Highland Park, Mich., a corporation of Delaware Application June 28, 1941, Serial No. 400,211

2 Claims. (Cl. 296—26)

This invention relates to improvements in vehicle bodies and more particularly to automotive vehicular bodies of the type for carrying passengers.

An object of the invention is to provide a vehicular body wherein the normal usable space can be conveniently and economically increased.

A further object of the invention is to provide a closed body of the foregoing type wherein the space available for occupancy or other use can be increased while maintaining the closed characteristics of the body.

More specifically, an object of the invention is to provide a vehicular body having a panel comprising a plurality of swingable sections which can be so moved from their normal panel closing position as to attain the foregoing results, one of such sections preferably being positionable to increase the floor space of the body; to provide a covering so arranged as to substantially close the panel when the members thereof are positioned to increase the body space or area available for use; and to provide an improved arrangement for detachably securing and supporting the cover in its closing position.

A still further object of the invention is to provide the foregoing arrangement in conjunction with a vehicular body having passenger seats whereby the body can, in effect, be so elongated as to provide comfortable and convenient space for sleeping of passengers while maintaining at least one of the seats for normal use.

Other objects and advantages of the invention will be more apparent from the following description taken in connection with the accompanying drawing, in which:

Fig. 1 is a fragmentary side elevational view of a motor vehicle including a body embodying the invention.

Fig. 2 is an end elevational view of the Fig. 1 showing.

Fig. 3 is an enlarged view, partly in section, taken on line 3—3 of Fig. 2.

Fig. 4 is an enlarged fragmentary sectional view taken on line 4—4 of Fig. 2.

Fig. 5 is an enlarged fragmentary sectional view taken on line 5—5 of Fig. 2.

Fig. 6 is an enlarged fragmentary sectional view taken on line 6—6 of Fig. 2.

Fig. 7 is an enlarged fragmentary view in perspective illustrating the manner in which the cover supporting staves are detachably secured to one of the rear panel section members.

Referring to the drawing, the numeral 9 designates a motor vehicle body of the closed type which is especially adapted for the station wagon model of vehicle. The body comprises a floor 11, side panels 12 and a rear panel consisting of swingably mounted upper and lower section members 13 and 14, respectively.

The members 13 and 14 are positionable to close the rear panel independently of a cover structure, indicated generally at 15, associated therewith and when so positioned the adjacent flanged edges thereof are spaced by a rubber buffer 16. The member 13 is hinged at 17 to the body 10 and when swung to its open position is retained therein by a pair of spaced foldable linkages, one of which is shown at 18. The member 14 is hinged at 19 to the body 10 and is retained in its open position by a pair of spaced foldable linkages, one of which is shown at 20.

A drip moulding 21 carried by the roof 10 is disposed immediately adjacent the hinge 17 and is so shaped in cross section as to provide spaced troughs indicated at 22 and 23, respectively, the trough 22 opening rearwardly. A plate 17' projects outwardly from the body 10 beneath the trough 22 and over the hinge joint 17 as a shield for the latter.

When the panel section members 13 and 14 are disposed as illustrated the latter constitutes an extension of the floor 11 and the former constitutes in effect an extension of the roof 10 and the cover structure 15 in cooperation with these members closes the extension thus formed.

The cover structure 15 includes a sheet of material 24 preferably of fabric and having the necessary qualities to withstand exposure to sun and rain. The cover rests upon at least a portion of the outer surface of the upper section member 13, the upper edge portion having a stiffener 25 secured thereto which rests on the shield plate 17' and extends into the trough 22 of the moulding 21, the upper edge being further provided with hooks, one of which is shown at 26, which is engaged in the moulding trough 23 for securing the cover to the body 10. The lower end portion of the cover is reinforced and stiffened, as shown more particularly in Fig. 5 and extends in overlapping relationship to the free end face of member 14. An attaching strip 27 carried by the sheet 24 is detachably secured to the member 14 by a plurality of spaced fasteners, one of which is shown at 28, preferably of the snap-type.

For the purpose of supporting and shaping that portion of the sheet 24 intermediate the members 13 and 14 there are provided a plurality of spaced staves 29, each of which has a pair of angularly disposed flanges 30 and 31 at the lower end thereof, the flange 30 resting upon the upper wall of the member 14 and the flange 31 extending through an opening in this wall, as illustrated in Fig. 4. The upper end of each stave 29 is secured to the upper panel section member 13 and, as illustrated in Fig. 7, this member has a portion of the upper surface thereof cut away to provide a groove 32 adjacent its free edge and the mid-portion of the bottom wall of this groove is cut away to provide a relatively smaller groove 33 which receives the reduced end portion 34 of the stave 29. Thus the upper surface of the stave end is flush with the bottom wall of the groove 32 and the latter is closed by a plate 35 flush with the upper surface of the member 13 and secured to the latter by screws 36. Formation of the stave end portion 34 provides spaced shoulders 37 which abut the edge of the member 13.

The staves 29 are formed substantially straight and are preferably made of spring steel so that when secured in place they will bow outwardly to provide the body extension with a rear wall having a curved contour. The cover provides spaced side walls, as well as the end wall, and the free edge portion of each side wall carries snap elements cooperating with snap elements carried by the body for securing the cover to the latter as indicated at 38. Each side wall is provided with a window 39.

The foregoing arrangement provides a closed extension for the body and makes available such additional space as to accommodate the convenient and comfortable sleeping of passengers while maintaining at least a portion of the body for normal seating of passengers. When not used the extension can be readily removed and the body restored to its normal condition. The improvement is particularly adapted for use in connection with the station wagon model wherein one or more of the several seats may be removed to provide, in conjunction with the extension, space for the sleeping of passengers while at least one of the seats is retained for normal use.

Although but one embodiment of the invention is herein illustrated and described, it will be understood that various changes including the size, shape and arrangement of parts can be made without departing from the spirit of the invention, and it is not intended that the invention be limited other than by the terms of the appended claims.

I claim:

1. In a vehicle body including a floor and a panel comprising upper and lower members mounted for swinging movement outwardly of the body to open position, said lower member when in its open position constituting an extension for the vehicle floor, a drip moulding carried by the vehicle body adjacent the upper member having a portion thereof trough-shaped in cross-section and a flanged edge spaced from said portion, a fabric covering extending between said members having a reinforced edge portion extending into said trough and a plurality of hooks detachably engaging the flanged edge of said moulding, the upper of said members constituting a support for said covering, means detachably securing another edge portion of said covering to the outer portion of said lower member, and a plurality of staves extending between and detachably secured to said members for supporting said covering intermediate said edges thereof, each of said staves being springingly flexible and having a length greater than the straight line distance between said members when the latter are in open position whereby said staves are bowed when positioned as aforesaid to define an arcuately contoured support for said covering.

2. In a vehicle body having a rear end-forming panel section comprising upper and lower hinged members disposed in spaced relation when moved to their open position, a drip moulding carried by the body adjacent said upper member and having a trough opening rearwardly of the vehicle, a shield projecting outwardly from the body overlying the hinge joint for said upper member and disposed below and extending outwardly beyond said trough, a covering adapted to at least partially close said panel section when said members are in their open position, said covering having a reinforced edge portion resting on said shield and extending into said trough, said edge portion having fastening means detachably engaging said moulding at a location of the latter spaced from said trough, and means securing another portion of said covering to said lower member.

DANIEL S. EDDINS.